United States Patent
Schrager et al.

(10) Patent No.: US 11,159,336 B2
(45) Date of Patent: Oct. 26, 2021

(54) RULES DRIVEN INTERACTIONS TRIGGERED ON WEBINAR CONTENT RETRIEVAL AND STORAGE

(71) Applicant: THINKRITE, INC., Fort Lauderdale, FL (US)

(72) Inventors: Joshua P. Schrager, Miami, FL (US); Brenda Horowitz, Plantation, FL (US); Omar Hussain, Plantation, FL (US); Shai Horowitz, Plantation, FL (US)

(73) Assignee: THINKRITE, INC., Fort Lauderdale, FL (US)

(*) Notice: Subject to any disclaimer, the term of this patent is extended or adjusted under 35 U.S.C. 154(b) by 0 days.

(21) Appl. No.: 16/529,945

(22) Filed: Aug. 2, 2019

(65) Prior Publication Data

US 2021/0036879 A1 Feb. 4, 2021

(51) Int. Cl.
- *H04L 12/18* (2006.01)
- *G06F 16/955* (2019.01)
- *G06K 9/34* (2006.01)

(52) U.S. Cl.
CPC ...... *H04L 12/1831* (2013.01); *G06F 16/9558* (2019.01); *G06K 9/344* (2013.01); *H04L 12/1822* (2013.01); *G06K 2209/01* (2013.01)

(58) Field of Classification Search
CPC ... H04L 65/403; H04L 51/04; H04L 65/1069; H04L 12/1827; H04L 12/1813; H04L 12/1822; H04L 65/4015; H04L 51/26; H04L 61/1594; H04L 67/02; H04L 67/327; H04L 51/18; H04L 65/4023; H04L 67/1095; H04L 65/1089; H04L 65/4038; H04L 67/38; H04L 12/1818; H04L 43/10; H04L 51/046; H04L 51/36; H04L 63/0815; H04L 65/1083; H04L 65/602; H04L 65/605; H04L 67/12; H04L 67/125; H04L 67/14; H04L 67/142; H04L 67/146; H04L 67/147; H04L 67/148; H04L 67/32; H04L 67/36; H04L 63/0861; H04L 63/107;

(Continued)

(56) References Cited

U.S. PATENT DOCUMENTS

2011/0252366 A1* 10/2011 Balasubramanian .. G06Q 10/10
715/809
2013/0078954 A1* 3/2013 Fan .................... H04M 1/72538
455/411

(Continued)

*Primary Examiner* — Djenane M Bayard
(74) *Attorney, Agent, or Firm* — Steven M. Greenberg, Esq.; Shutts & Bowen LLP

(57) ABSTRACT

A method for rules driven interactions for Webinar content retrieval and storage includes establishing a Webinar between a presenter and a live attendee, sharing a display of the presenter with the live attendee, detecting in the display a content portion and matching the content portion to one of a multiplicity of rules. Thereafter, the matched one of the rules is executed so as to present additional content in a user interface of the live attendee and the matched one of the rules is stored in a recording of the Webinar, with an indication at which point in time during the Webinar the matched one of the rules had been executed. Finally, the stored recording is retrieved and played back to an offline attendee through a user interface to the Webinar and the matched one of the rules is executed so as to present additional content to the offline attendee.

20 Claims, 2 Drawing Sheets

(58) Field of Classification Search
CPC ... H04L 67/1097; H04L 67/141; H04L 67/20; H04L 29/06027; H04L 29/06; H04L 63/0823; H04L 63/104; H04L 63/166; H04L 63/168; H04L 65/1059; H04L 63/062; H04L 65/1093; H04L 67/18; H04L 67/303; H04L 67/306; G06F 3/0481; G06F 3/0488; G06F 2203/04803; G06F 3/04817; G06F 3/0482; G06F 2203/04804; G06F 3/038; G06F 3/0486; G06F 3/1454; G06F 3/1423; G06F 9/5016; G06F 3/04842; G06F 3/04883; G06F 8/38; G06F 9/451

See application file for complete search history.

(56) References Cited

U.S. PATENT DOCUMENTS

| | | | |
|---|---|---|---|
| 2013/0212488 A1* | 8/2013 | Scherpa | G06Q 10/101 |
| | | | 715/753 |
| 2013/0254279 A1* | 9/2013 | Bentley | G06F 16/9535 |
| | | | 709/204 |
| 2015/0178388 A1 | 6/2015 | Winnemoeller et al. | |
| 2016/0099984 A1 | 4/2016 | Karagiannis et al. | |
| 2016/0234276 A1* | 8/2016 | Ouyang | H04L 65/403 |
| 2017/0154030 A1 | 6/2017 | Moorjani et al. | |
| 2017/0371496 A1 | 12/2017 | Denoue et al. | |
| 2018/0234471 A1* | 8/2018 | Qian | H04L 61/2589 |
| 2019/0034434 A1* | 1/2019 | Huang | H04L 12/1831 |
| 2020/0145616 A1* | 5/2020 | Nassar | H04M 3/567 |

* cited by examiner

RULES DRIVEN INTERACTIONS TRIGGERED ON WEBINAR CONTENT RETRIEVAL AND STORAGE

BACKGROUND OF THE INVENTION

Field of the Invention

The present invention relates to the field of shared content in a shared presentation, and more particularly to screen sharing in an e-meeting.

Description of the Related Art

An electronic meeting, hereinafter "e-meeting", in its broadest sense, is a collaboration between individuals that occurs electronically over a computer communications network. In a typical e-meeting, different individuals exchange messages through a computer interface to a common location. The most rudimentary form of an e-meeting is a discussion forum in which postings in a thread pertaining to a particular topic are provided serially in an asynchronous conversation. More advanced forms of an e-meeting provide for real-time exchanges of messages such as is the case in a chat room.

Of note, the modern e-meeting platform combines multiple different collaborative technologies to emulate a "real", "live", "in-person" conference. Those technologies include audio and video conferencing over the Internet, instant messaging and chat room, screen sharing, polling, white boarding, and application sharing. Of note, the leading edge of e-meetings has found common ground with the virtual world platform in which participants to an e-meeting can be represented visually to other participants by way of an avatar and the venue for the e-meeting can be a simulated virtual environment.

The confluence of the foregoing technologies thusly has enabled the delivery of a seminar within an e-meeting, often referred to as a "Webinar". In a Webinar, a presenter in an e-meeting presents content to attendees to the meeting. Usually, screen sharing in one form or another facilitates the presenter sharing presentation materials with the attendees, including simple documents, live whiteboards, and in more sophisticated circumstances, audio, video and audiovisual material. Like an e-meeting, a Webinar may be recorded for off-line viewing by other attendees at a later time. But, no interactivity between presenter and off-line attendees is possible since the presenter is not present during off-line viewing.

In many instances, interactivity between the presenter and attendees is encouraged, for instance by sharing access to shared materials for annotation by selected ones of the attendees, or by one or more of the attendees also sharing content with the others of the attendees to the Webinar. In this regard, Screen Sharing often occurs in which the presenter demonstrates the browsing of network accessible content through a screen shared Web browser and attendees participate in the Screen Sharing session by engaging in navigable controls presented through the shared Web browser so as to direct the navigation of the Web browsing session along with the presenter and others of the attendees.

Yet, in all instances of attendee interaction with the presenter, such interaction must occur spontaneously or at the manual direction of the presenter and while the presenter is presenting and not later during the off-line viewing of the Webinar. Thus, absent the a priori knowledge of the attendees as to the permissibility of interactivity and the availability of different e-meeting tools to engage in interactivity, and barring full participation by all attendees live as the presenter presents material in a Webinar, it remains unlikely that both live and off-line attendees to a Webinar will fully engage in an interactive session resulting in a less effective presentation.

BRIEF SUMMARY OF THE INVENTION

Embodiments of the present invention address deficiencies of the art in respect to promoting interactivity in a Webinar and provide a novel and non-obvious method, system and computer program product for rules driven interactions for Webinar content retrieval and storage. In an embodiment of the invention, a method for rules driven interactions for Webinar content retrieval and storage includes first establishing a Webinar, between a presenter and a live attendee, in memory of a host computing platform, with the live attendee accessing the Webinar from over a computer communications network within a user interface to the Webinar displayed in a corresponding client computing device of the live attendee. The method further includes sharing a display of the presenter in the user interface of the live attendee and detecting in the display a content portion and matching the content portion to one of a multiplicity of rules. Finally, the method includes executing the matched one of the rules in the host computing platform so as to present additional content in the user interface of the client computing device of the live attendee and storing in a recording of the Webinar, the matched one of the rules with an indication at which point in time during the Webinar the matched one of the rules had been executed. In one aspect of the embodiment, the method additionally includes retrieving the stored recording of the Webinar, playing back the stored recording to an offline attendee through a user interface to the Webinar displayed in a corresponding computing device of the offline attendee and executing the matched one of the rules in the host computing platform, the execution of the matched one of the rules presenting additional content in the user interface of the client computing device of the offline attendee.

In one aspect of the embodiment, the additional content is a hyperlink to a Web site configured upon selection to display the Web site in a Web browser co-resident with the user interface to the Webinar in the client computing device of the live attendee. In another aspect of the embodiment, the additional content is a poll of choices configured to receive a selection of one of the choices and to transmit the selection to the host computing platform. In this regard, the content portion may be a specific uniform resource locator (URL) such that the matched one of the rules when executed triggers a retrieval of additional content from the URL in the Web browser, a setting of a data field within the additional content and a presentation of a poll of choices configured to receive a selection of one of the choices and to transmit the selection to the host computing platform. In yet another aspect of the embodiment, the rules limit the presenting of the additional content only for a specific attendee. In even yet another aspect of the embodiment, the content portion is an image of text such that the image of text is first subjected to optical character recognition (OCR) to produce the text and the text is then matched to the multiplicity of rules.

In another embodiment of the invention, a data processing system is configured for rules driven interactions for Webinar content retrieval and storage. The system includes a host computing platform including one or more computers, each with memory and at least one processor, and that is communicatively coupled over a computer communications network to different client computers. The system also includes an e-meeting server executing in the memory of the host computing platform. The e-meeting server establishes a Webinar between a presenter and different live attendees, each with a respective one of the different client computers, each of the live attendees accessing the e-meeting through a respective user interface presented in a corresponding one of the client computers. Finally, the system includes a rules driven interactions module.

The rules driven interactions module includes computer program instructions executing in the memory of the host computing platform. The program instructions during execution share a display of the presenter in each user interface of each of the live attendees, detect in the display a content portion and match the content portion to one of a multiplicity of rules stored in the memory of the host computing platform. The program instructions further execute the matched one of the rules in the host computing platform, the execution of the matched one of the rules presenting additional content in the user interface of the corresponding client computing device of at least one of the live attendees. Finally, the program instructions store in a recording of the Webinar the matched one of the rules with an indication at which point in time during the Webinar the matched one of the rules had been executed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for rules driven interactions for Webinar content retrieval and storage. In accordance with an embodiment of the invention, an e-meeting is established in memory of a host computing platform including a presenter and at least one attendee accessing the e-meeting in the host computing platform remotely in a client computing device. During the e-meeting, screen-sharing may be activated in respect to a display of the presenter. As such, the display of the presenter, or a portion thereof, may be reproduced for viewing in a user interface of the client computing device of each attendee. Importantly, specific content within the display can be recognized and mapped to a specific rule amongst a set of rules stored in the memory of the host computing platform. Each rule is structured to trigger an action within the user interface of the attendee. As well, during recording of the e-meeting, each invocation of a rule may be noted within the recording as having occurred at a specific moment during the e-meeting and, upon off-line viewing of the e-meeting, when encountering an annotation of the e-meeting indicating a triggering of a rule, so too can the rule be triggered for the off-line attendee as if the off-line attendee had participated in the e-meeting live.

In one aspect of the embodiment described hereinabove, the action may be the display within an application executing in the client computing device of a specific document corresponding to the specific content of the display of the presenter. Alternatively, the action may be the launching of a polling application in the user interface of the client computing device. As well, optionally, each rule can be specific to a particular attendee or class of attendees such that the same specific content may map to a different rule depending upon a particular attendee receiving the display of the presenter. In this way, interactivity can be selectively encouraged amongst the attendees of a Webinar without requiring the attendees and the presenter to manually provoke specific interactivity or to maintain an awareness of the specific applications available for use for the purpose of interactivity in a Webinar.

Figure 1:
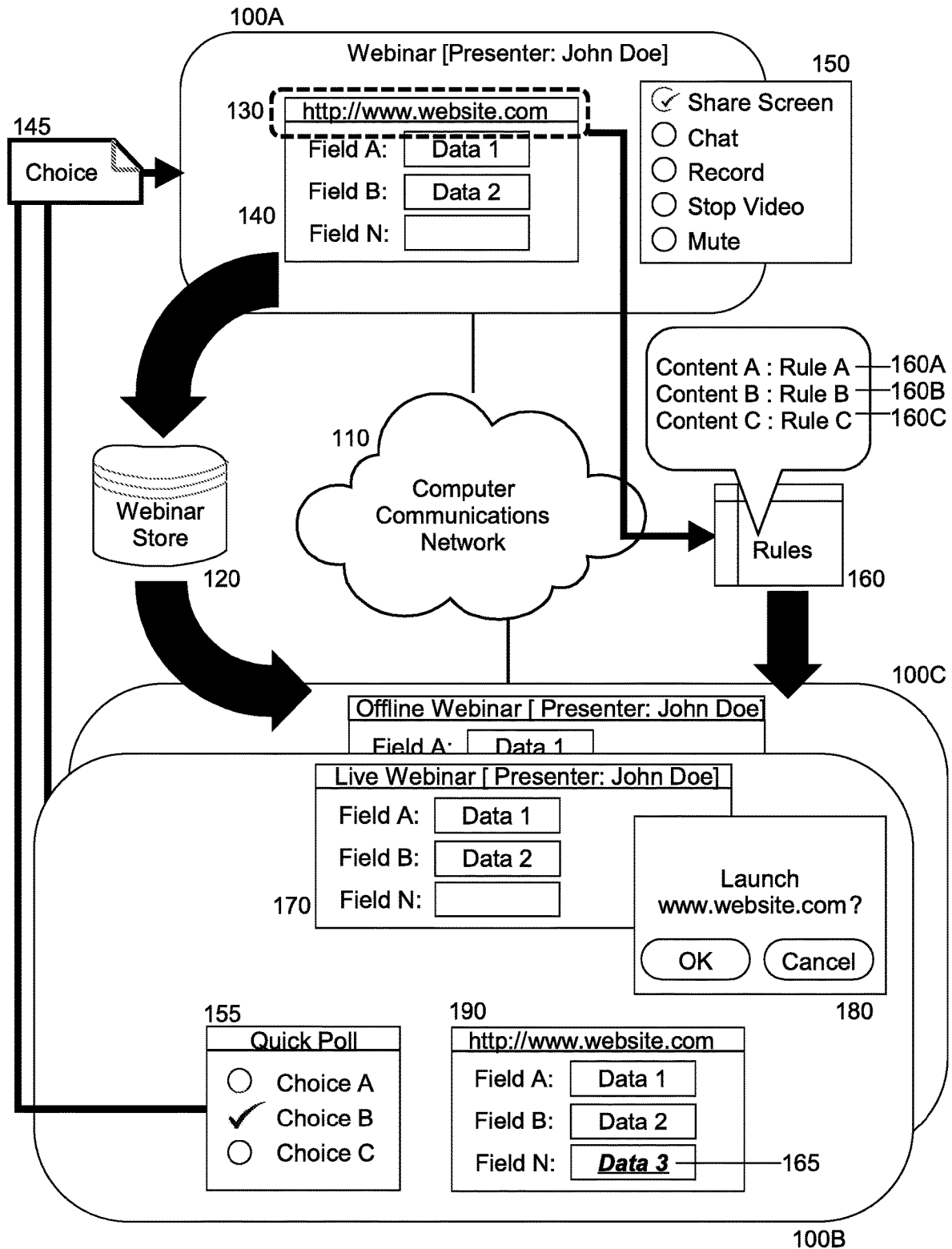
FIG. 1 is pictorial illustration of a process for rules driven interactions for Webinar content retrieval and storage.

In further illustration of a particular embodiment of the invention, FIG. 1 pictorially shows a process for rules driven interactions for Webinar content retrieval and storage. As shown in FIG. 1, an e-meeting in the form of a Webinar is established as between a presenter and one or more live attendees. A display 100A of the presenter then may be shared in a user interface 170 of the Webinar within a display 100B for each of the live attendees by activating in control window 150, a request to share at least a portion of the display 100A. In this regard, the portion of the display can include a Web browser 140 in which a Web page is rendered as retrieved from a location 130 over the global Internet, for example in the form of a URL.

Notably, in response to the sharing of the portion of the display, rule driven interaction logic 165 identifies within the shared portion, the specific content of the address 130. For instance, the logic 165 either parses text within the shared portion in order to extract the specific content, identifies imagery associated with the specific content, or performs OCR upon the image to extract the specific content. Thereafter, the logic 165 locates in rules table 160, one or more rules 160A, 160B, 160C mapped to the specific content. Optionally, the rules 160A, 160B, 160C may be filtered in respect to the identity of the live attendees or a classification or role of the live attendees. As such, the filtered ones of the rules 160A, 160B, 160C are then executed so as to trigger one or more actions in the display 100B of each of the live attendees. The action can include, for instance, the rendering of a prompt 180 to launch a Web browser 190 in the display 100B and to load therein the Web page at the location 130, so that a permitted one of the live attendees may provide additional input into a field 165 of the Web page so as to be visible to all attendees receiving the shared portion of the display 100A. The action further can include the rendering in the display 100B of a poll 155 with a selection 145 received in each display 100B being transmitted back to the display 100A.

Importantly, the entirety of the Webinar may be recorded and persisted to fixed storage 120. As part of the persistence process, the logic 165 may include in the recorded Webinar, an indication of any of the rules 160A, 160B, 160C triggered in the display 100B and a moment in time during the Webinar when the rules 160A, 160B, 160C had been triggered. To that end, during playback of the Webinar in a display 100C of an offline attendee, the logic 165 triggers the same ones of the rules 160A, 160B, 160C in the display 100C of the offline attendee so as to also cause the action such as the rendering of the prompt 180 to launch the Web browser 190 in the display 100C of the offline attendee and the loading therein of the Web page at the location 130, and the rendering in the display 100C of the poll 155. In this way, the desired degree of automated interactivity can be maintained in respect both to the live attendee and also the offline attendee.

Figure 2:
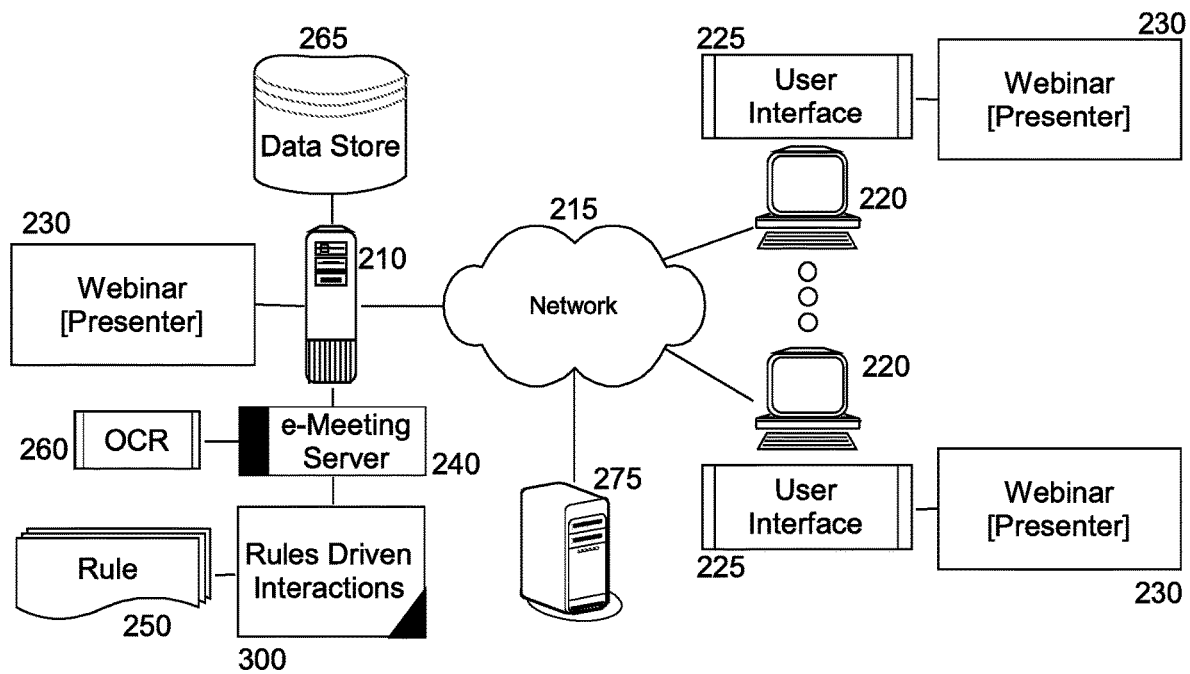
FIG. 2 is a schematic illustration of a data processing system adapted for rules driven interactions for Webinar content retrieval and storage; and, FIG. 3 is a flow chart illustrating a process for rules driven interactions for Webinar content retrieval and storage.

The process described in connection with FIG. 1 may be implemented within a data processing system. In further illustration, FIG. 2 schematically shows a data processing system adapted for rules driven interactions for Webinar content retrieval and storage. The system includes a host computing platform 210 that includes one or more computers, each with memory and at least one processor. An e-meeting server 240 executes in the memory of the host computing platform 210 and is configured during operation to host e-meetings amongst different attendees, and more particularly, Webinars as between a presenter and one or more live attendees.

In this regard, when managing delivery of a Webinar 230, the e-meeting server 240 transmits over computer communications network 215 content provided by the presenter, such as audio content, video content, shared screen content and the like, to a user interface 225 of each live attendee as provided in a corresponding client computing device 220. In respect to the latter, shared screen imagery 230 is provided within the user interface 225 at the direction of the presenter. The shared screen imagery 230 may include, for instance, imagery of a Web browser of the presenter in which content is loaded for viewing as retrieved from over the computer communications network 215 from a Web server 275. Finally, the e-meeting server 240 is configured to record the Webinar during live presentation and to deliver the recorded Webinar to requesting offline attendees for offline viewing.

Notably, the system additionally includes a rules driven interactions module 300. The module 300 includes computer program instructions that when executed by the processor of the host computing platform 210, is enabled to detect in the shared screen imagery 230, specific content such as a particular URL for the content retrieved from the Web server 275. For instance, text within the shared screen imagery 230 may be subjected to OCR 260 in order to produce parseable text. The program instructions further are enabled during execution to map the specific content including parseable text to a corresponding one of a multiplicity of rules 250 in order to identify a specific one of the rules 250 to be triggered in the user interface 225 of one or more of the attendees.

For instance, the rules 250 when triggered may cause the display of a prompt in the user interface 225 to launch a Web browser and to load therein the content from the URL. As well, the rules 250 when triggered may cause the display of a poll and the receipt thereafter of a selection in the poll. Optionally, the rules 250 may be limited for triggering only in respect to the specific identity of a particular attendee, live or offline. As yet another option, the rules 250 may be limited for triggering only in respect to a particular role of the attendees, live or offline.

Finally, the program instructions of the rules driven interactions module 300 are enabled during execution to record the Webinar for storage in data store 265, and to annotate the recorded Webinar with the identity of each one of the rules 250 triggered during the presentation of the Webinar and a time during the Webinar when the rules 250 had each been triggered. Consequently, the program instructions of the module 300 during the replay of the stored Webinar may trigger each of the rules annotating the Webinar at the correct moment in time during the playback of the Webinar in the user interface 225 of an offline attendee.

Figure 3:
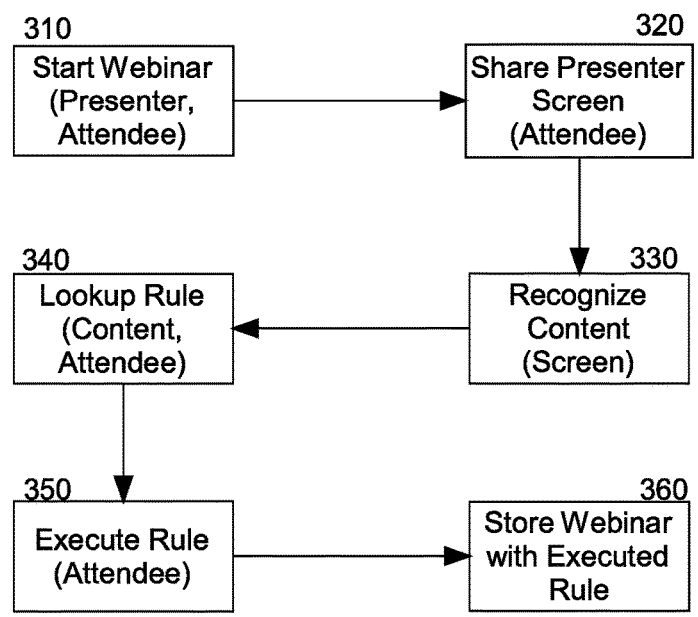

In even further illustration of the operation of the rules driven interactions module 300, FIG. 3 is a flow chart illustrating a process for rules driven interactions for Webinar content retrieval and storage. Beginning in block 310, a Webinar is initiated in the e-meeting server as between a presenter and one or more live attendees. In block 320, a portion of the display of the presenter is selected for screen sharing and imagery of the portion selected for screen sharing is transmitted to each of the live attendees for display in a user interface to the e-meeting server. In block 330, specific content in the imagery is recognized, either directly in terms of textual content, or pictographic content, or indirectly through OCR. Then, in block 340 a rule is located that has been mapped to the specific content.

Thereafter, in block 350 the located rule is executed so as to cause the display of additional imagery in the user interface of each of the live attendees. For example, the additional imagery may be a prompt to launch a Web browser and to load therein, content from a network address such as a URL included in the specific content. As another example, the additional imagery may be a polling window in which a selection may be made and transmitted back to the presenter. In any case, in block 360, the entirety of the Webinar may be recorded and stored along with an indication of the triggering of the located rule and a moment in time during the Webinar when the rule had been triggered. In this way, interactivity with the presenter during the course of the Webinar may be automatically provoked irrespective of whether or not the attendee attends the Webinar live or offline.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for rules driven interactions for Webinar content retrieval and storage, the method comprising:
    establishing a Webinar, between a presenter and a live attendee, in memory of a host computing platform, the live attendee accessing the Webinar from over a computer communications network within a user interface to the Webinar displayed in a corresponding client computing device of the live attendee;
    initiating recording of the Webinar;
    sharing during the recording of the Webinar, a display of the presenter in the user interface of the live attendee;
    detecting in the display a content portion and matching the content portion to one of a multiplicity of rules;
    executing the matched one of the rules in the host computing platform, the execution of the matched one of the rules presenting additional content in the user interface of the client computing device of the live attendee;
    ending the recording of the Webinar and subsequent to the ending of the recording of the Webinar, storing the recorded Webinar in a file;
    annotating the stored recording of the Webinar with the matched one of the rules and additionally an indication at which point in time during the Webinar the matched one of the rules had been executed; and,
    retrieving the stored and annotated recording of the Webinar in response to a request to replay the Webinar, the annotated Webinar causing the matched one of the rules to execute at the point in time annotated in respect to the recording of the Webinar during the replay of the Webinar.

2. The method of claim 1, further comprising:
    retrieving the stored recording of the Webinar;
    playing back the recording to an offline attendee through a user interface to the Webinar displayed in a corresponding computing device of the offline attendee; and,
    executing the matched one of the rules in the host computing platform, the execution of the matched one of the rules presenting additional content in the user interface of the client computing device of the offline attendee.

3. The method of claim 2, wherein the additional content is a hyperlink to a Web site configured upon selection to display the Web site in a Web browser co-resident with the user interface to the Webinar in the client computing device of the live attendee.

4. The method of claim 3, wherein the content portion is a specific uniform resource locator (URL) and the matched one of the rules when executed triggers a retrieval of additional content from the URL in the Web browser, a setting of a data field within the additional content and a presentation of a poll of choices configured to receive a selection of one of the choices and to transmit the selection to the host computing platform.

5. The method of claim 2, wherein the additional content is a poll of choices configured to receive a selection of one of the choices and to transmit the selection to the host computing platform.

6. The method of claim 1, wherein the rules limit the presenting of the additional content only for a specific attendee.

7. The method of claim 1, wherein the content portion is an image of text such that the image of text is first subjected to optical character recognition (OCR) to produce the text and the text is then matched to the multiplicity of rules.

8. A data processing system configured for rules driven interactions for Webinar content retrieval and storage, the system comprising:
  a host computing platform comprising one or more computers, each with memory and at least one processor, and communicatively coupled over a computer communications network to different client computers;
  an e-meeting server executing in the memory of the host computing platform and establishing a Webinar between a presenter and different live attendees, each with a respective one of the different client computers, each of the live attendees accessing the e-meeting through a respective user interface presented in a corresponding one of the client computers; and,
  a rules driven interactions module comprising computer program instructions executing in the memory of the host computing platform, the program instructions performing:
  initiating recording of the Webinar;
  sharing during the recording of the Webinar, a display of the presenter in each user interface of each of the live attendees;
  detecting in the display a content portion and matching the content portion to one of a multiplicity of rules stored in the memory of the host computing platform;
  executing the matched one of the rules in the host computing platform, the execution of the matched one of the rules presenting additional content in the user interface of the client computing device of the live attendee;
  ending the recording of the Webinar and subsequent to the ending of the recording of the Webinar, storing the recorded Webinar in a file;
  annotating the stored recording of the Webinar with the matched one of the rules and additionally an indication at which point in time during the Webinar the matched one of the rules had been executed; and,
  retrieving the stored and annotated recording of the Webinar in response to a request to replay the Webinar, the annotated Webinar causing the matched one of the rules to execute at the point in time annotated in respect to the recording of the Webinar during the replay of the Webinar.

9. The system of claim 8, wherein the program instructions further perform:
  retrieving the stored recording of the Webinar;
  playing back the recording to an offline attendee through a user interface to the Webinar displayed in a corresponding computing device of the offline attendee; and,
  executing the matched one of the rules in the host computing platform, the execution of the matched one of the rules presenting additional content in the user interface of the client computing device of the offline attendee.

10. The system of claim 9, wherein the additional content is a hyperlink to a Web site configured upon selection to display the Web site in a Web browser co-resident with the user interface to the Webinar in the client computing device of the live attendee.

11. The system of claim 9, wherein the additional content is a poll of choices configured to receive a selection of one of the choices and to transmit the selection to the host computing platform.

12. The system of claim 8, wherein the rules limit the presenting of the additional content only for a specific attendee.

13. The system of claim 8, wherein the content portion is an image of text such that the image of text is first subjected to optical character recognition (OCR) to produce the text and the text is then matched to the multiplicity of rules.

14. A computer program product for rules driven interactions for Webinar content retrieval and storage, the computer program product including a non-transitory computer readable storage medium having program instructions embodied therewith, the program instructions executable by a device to cause the device to perform a method including:
  establishing a Webinar, between a presenter and a live attendee, in memory of a host computing platform, the live attendee accessing the Webinar from over a computer communications network within a user interface to the Webinar displayed in a corresponding client computing device of the live attendee;
  initiating recording of the Webinar;
  sharing during the recording of the Webinar, a display of the presenter in the user interface of the live attendee;
  detecting in the display a content portion and matching the content portion to one of a multiplicity of rules;
  executing the matched one of the rules in the host computing platform, the execution of the matched one of the rules presenting additional content in the user interface of the client computing device of the live attendee;
  ending the recording of the Webinar and subsequent to the ending of the recording of the Webinar, storing the recorded Webinar in a file;
  annotating the stored recording of the Webinar with the matched one of the rules and additionally an indication at which point in time during the Webinar the matched one of the rules had been executed; and,
  retrieving the stored and annotated recording of the Webinar in response to a request to replay the Webinar, the annotated Webinar causing the matched one of the rules to execute at the point in time annotated in respect to the recording of the Webinar during the replay of the Webinar.

15. The computer program product of claim 14, wherein the method further comprises:
  retrieving the recording of the Webinar;
  playing back the stored recording to an offline attendee through a user interface to the Webinar displayed in a corresponding computing device of the offline attendee; and,
  executing the matched one of the rules in the host computing platform, the execution of the matched one of the rules presenting additional content in the user interface of the client computing device of the offline attendee.

16. The computer program product of claim 15, wherein the additional content is a hyperlink to a Web site configured upon selection to display the Web site in a Web browser co-resident with the user interface to the Webinar in the client computing device of the live attendee.

17. The computer program product of claim 16, wherein the content portion is a specific uniform resource locator (URL) and the matched one of the rules when executed triggers a retrieval of additional content from the URL in the Web browser, a setting of a data field within the additional content and a presentation of a poll of choices configured to receive a selection of one of the choices and to transmit the selection to the host computing platform.

18. The computer program product of claim 15, wherein the additional content is a poll of choices configured to receive a selection of one of the choices and to transmit the selection to the host computing platform.

19. The computer program product of claim 14, wherein the rules limit the presenting of the additional content only for a specific attendee.

20. The computer program product of claim 14, wherein the content portion is an image of text such that the image of text is first subjected to optical character recognition (OCR) to produce the text and the text is then matched to the multiplicity of rules.

* * * * *